US 6,633,805 B2

(12) United States Patent
Burgart et al.

(10) Patent No.: US 6,633,805 B2
(45) Date of Patent: Oct. 14, 2003

(54) CONTROL SYSTEM FOR REVERSER TRANSMISSION HAVING AGGRESSIVE AND NON-AGGRESSIVE MODES

(75) Inventors: Joseph G. Burgart, Martinez, GA (US); Tyron D. Johnson, Coffeyville, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/905,645

(22) Filed: Jul. 13, 2001

(65) Prior Publication Data

US 2003/0014172 A1 Jan. 16, 2003

(51) Int. Cl.[7] .................................................. G06F 7/00
(52) U.S. Cl. ................................... 701/51; 701/58
(58) Field of Search ............................. 701/51, 53, 54, 701/58; 477/34, 70

(56) References Cited

U.S. PATENT DOCUMENTS

| | | |
|---|---|---|
| 4,610,183 A | 9/1986 | Nobumoto et al. |
| 4,648,803 A | 3/1987 | Stephenson et al. |
| 4,769,774 A | 9/1988 | Narita et al. |
| 5,212,998 A | 5/1993 | Testerman |
| 5,251,733 A | 10/1993 | Falck et al. |
| 5,449,329 A | 9/1995 | Brandon et al. |
| 5,560,203 A | 10/1996 | Pollman |
| 6,002,976 A | 12/1999 | Hollstein et al. |
| 6,022,292 A | 2/2000 | Goodnight |
| 6,202,783 B1 | 3/2001 | Taylor et al. |

Primary Examiner—Yonel Beaulieu
(74) Attorney, Agent, or Firm—Polit & Erickson, LLC

(57) ABSTRACT

A control system for a utility vehicle transmission provides for operator selection of vehicle "aggressiveness," or rates of acceleration in response to operator command. The aggressiveness of a vehicle's performance can be controlled by modulating control signals to proportional control valves, which determine the transmission acceleration, according to two or more electrical ramp-up (or ramp-down) profiles, in response to an operator's acceleration command (or deceleration command). The transmission control system includes a controller, directional switches and electro-hydraulic valves which control hydraulic pressure in the clutch packs in a reverser transmission. The operator is provided with a two-position set switch. With the set switch in the less aggressive position, in response to an operator's command, the software in the controller provides a relatively slow current ramp to energize the control valves. With the switch in the more aggressive position, the current ramps and resultant pressure ramps are faster, thus causing more aggressive transmission operation for the reverser transmission.

20 Claims, 5 Drawing Sheets

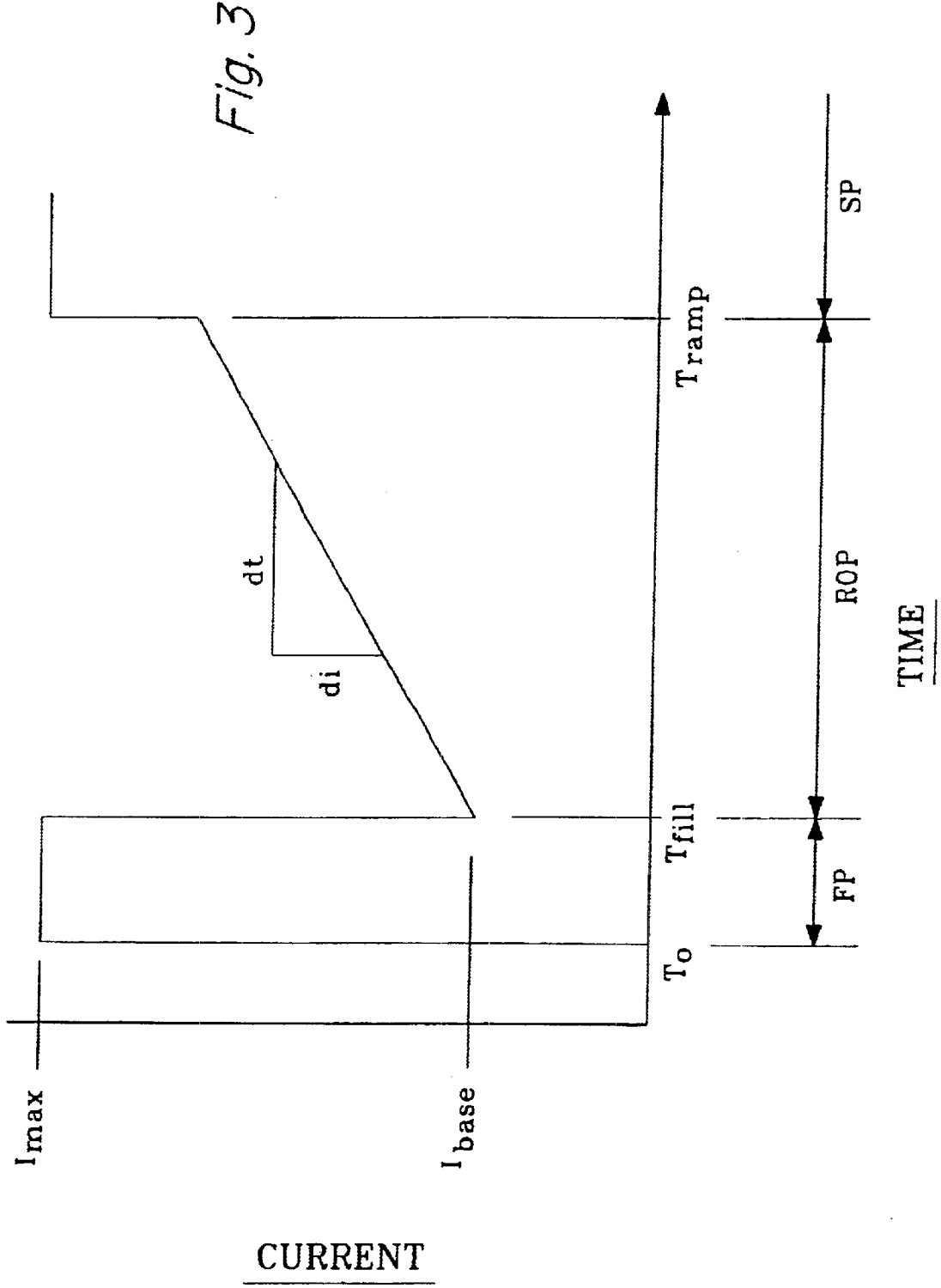

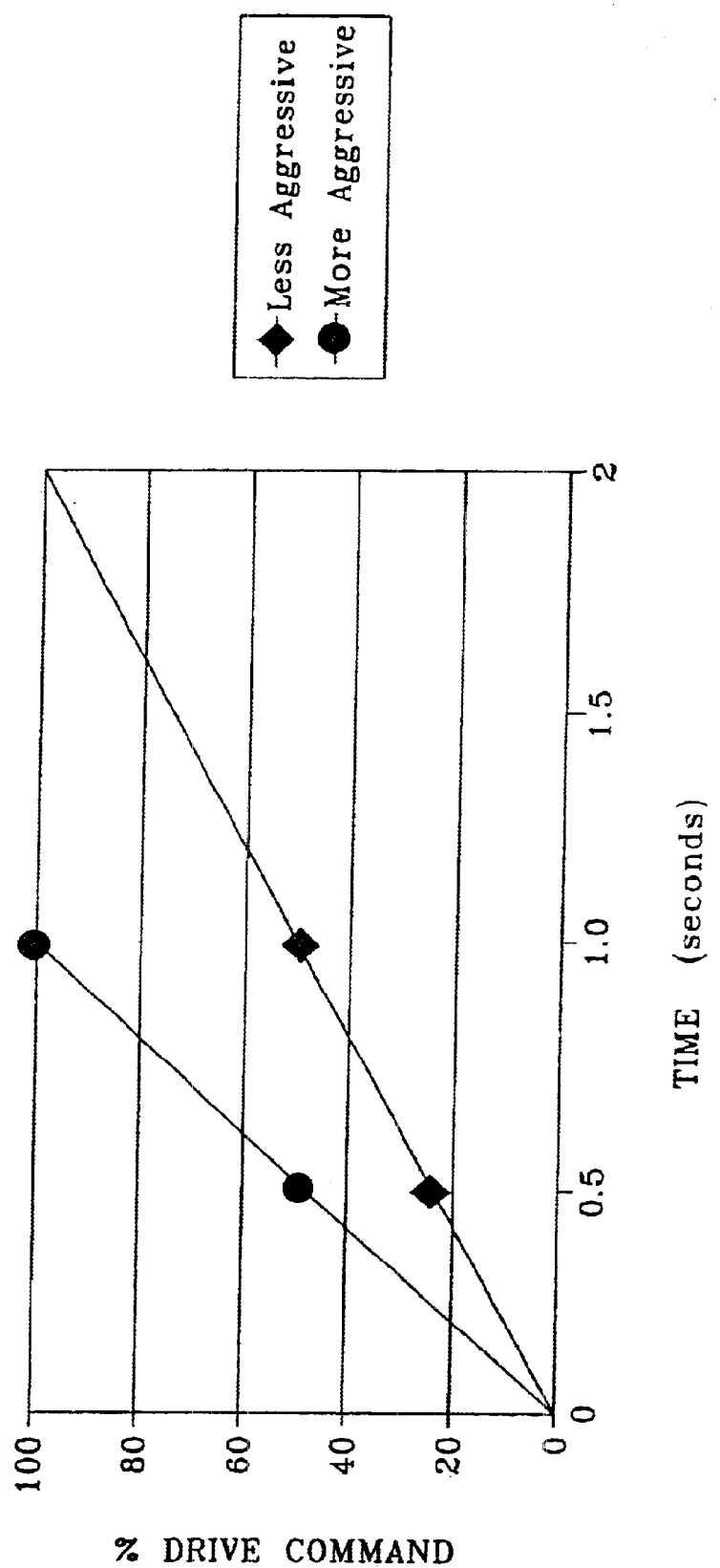

CONTROL SYSTEM FOR REVERSER TRANSMISSION HAVING AGGRESSIVE AND NON-AGGRESSIVE MODES

TECHNICAL FIELD OF THE INVENTION

The invention relates to utility vehicles for industrial and agricultural use, such as utility tractors. Particularly, the invention relates to transmission control systems for such vehicles.

BACKGROUND OF THE INVENTION

Typical utility vehicles, such as compact tractors, utilize an engine operating substantially at a pre-selected speed that drives a transmission system or drive train that delivers power to one or more driven wheels. The transmission system includes a speed controllable transmission component, a gear selection component, and a differential component. The speed controllable transmission component can be, for example, a hydrostatic transmission, or a transmission that uses electro-hydraulically controlled forward and reverse clutch packs to initially accelerate the vehicle and to change vehicle direction (hereinafter referred to as a "reverser transmission"), such as a POWRREVERSER™ transmission incorporated in JOHN DEERE Series 4000 tractors.

The present inventors have recognized that the desired "aggressiveness" of a vehicle's performance, or rates of acceleration and deceleration in response to operator commands, depends on operator experience, the operating conditions of the vehicle and the work being performed with the vehicle. For example, experienced operators performing material handling work tend to prefer a vehicle that accelerates and decelerates aggressively, and allows quick changes in direction. An operator that is using a vehicle for turf care work would prefer less aggressive accelerations and decelerations to prevent damage to the grass caused by slipping of the vehicle wheels.

For hydrostatic transmissions and reverser transmissions, pre-selecting the vehicle performance is commonly done by sizing orifices to control the rate of fluid flow to the servo control system of the hydrostatic transmission or control the rate of fluid flow to clutch packs in the reverser transmission. With electronically controlled systems, the aggressiveness is commonly controlled by pre-selecting the rate of increase of the electrical control current to electro-hydraulic pressure reducing valves that control swashplate servo systems or clutch pack hydraulic pressures.

However, compact utility tractors are commonly used for both material handling and turf care as well as many other operations. The present inventors have recognized the desirability of providing a utility tractor that would allow the driver to choose the aggressiveness of the tractor's performance according to the work being done. Such a selectable aggressiveness would lead to improved tractor productivity.

SUMMARY OF THE INVENTION

The present invention provides for operator selection of vehicle "aggressiveness," or rates of acceleration in response to operator command. The aggressiveness of a vehicle's performance can be controlled by modulating control signals to control valves, control valves which determine the acceleration of the vehicle transmission, according to two or more electrical ramp-up (or ramp-down) profiles, in response to an operator's acceleration command (or deceleration command).

The selection of vehicle aggressiveness controls the acceleration rates of the vehicle in both forward and reverse operation.

According to the preferred embodiment of the present invention, a vehicle transmission control system includes a controller, directional switches or potentiometers and electro-hydraulic control valves which control hydraulic pressure in the clutch pack hydraulics in the reverser transmission.

The operator is provided with a two-position set switch. With the set switch in the less aggressive position, in response to an operator's command, the software in the controller provides a relatively slow current ramp to energize the electro-hydraulic control valves that control the actuation of transmission clutch packs in a reverser transmission. By ramping up the hydraulic pressure slowly, in response to the slow current ramps, acceleration is non-aggressive.

With the switch in the more aggressive position, the current ramps and resultant pressure ramps are faster, thus causing more aggressive transmission operation for the reverser transmissions.

The two-position set switch could be replaced with a potentiometer, thus permitting an infinitely variable range in transmission aggressiveness control.

By providing the tractor operator with selectable transmission aggressiveness, the operator can choose the acceleration/deceleration rates according to the operator's comfort or skill level and/or to the task being performed. The vehicle performance, controllability and productivity will be improved.

The invention also provides an interlock system. The system is used for a reverser transmission to prevent unanticipated motion. In order to start the engine on the tractor, the following must be sensed at the controller:

1. The forward-neutral-reverse lever must be sensed by the controller to be in neutral. Neutral is defined as having a neutral signal in combination with no forward signal and no reverse signal.
2. The main transmission shift lever must be in neutral.
3. The tractor power-take-off must be turned off.

When the forward-neutral-reverse lever is in the neutral position, no clutch-actuating hydraulic pressure must be sensed in either clutch pack or the tractor engine will be shut off. When the forward-neutral-reverse lever is in forward, then clutch-actuating hydraulic pressure must be present in the forward clutch pack, but not in the reverse clutch pack or the engine will be shut off. Reverse drive also has similar logic. Because clutch pack hydraulic pressures will be in transition when the forward-neutral-reverse lever is moved from one position to the other, time delays are provided to permit the ramping up or ramping down of pressure signals before the interlock logic is applied.

If hydraulic pressures in the forward or reverse clutch packs are not realized in approximately one second after the respective signal is received from the forward-neutral-reverse lever, then the controller will disable motion in that direction until another neutral signal from the forward-neutral-reverse lever is sensed.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 3 is a diagram showing the relationship between clutch pressure control valve energizing current and time after an operator's command is made, via the vehicle direction selector; and FIG. 4 is a diagram demonstrating the two aggressiveness settings and the time response of clutch pack hydraulic pressure as a percentage of the total drive command hydraulic pressure, for accelerations.

DETAILED DESCRIPTION OF THE PREFERRED EMBODIMENTS

Figure 1:
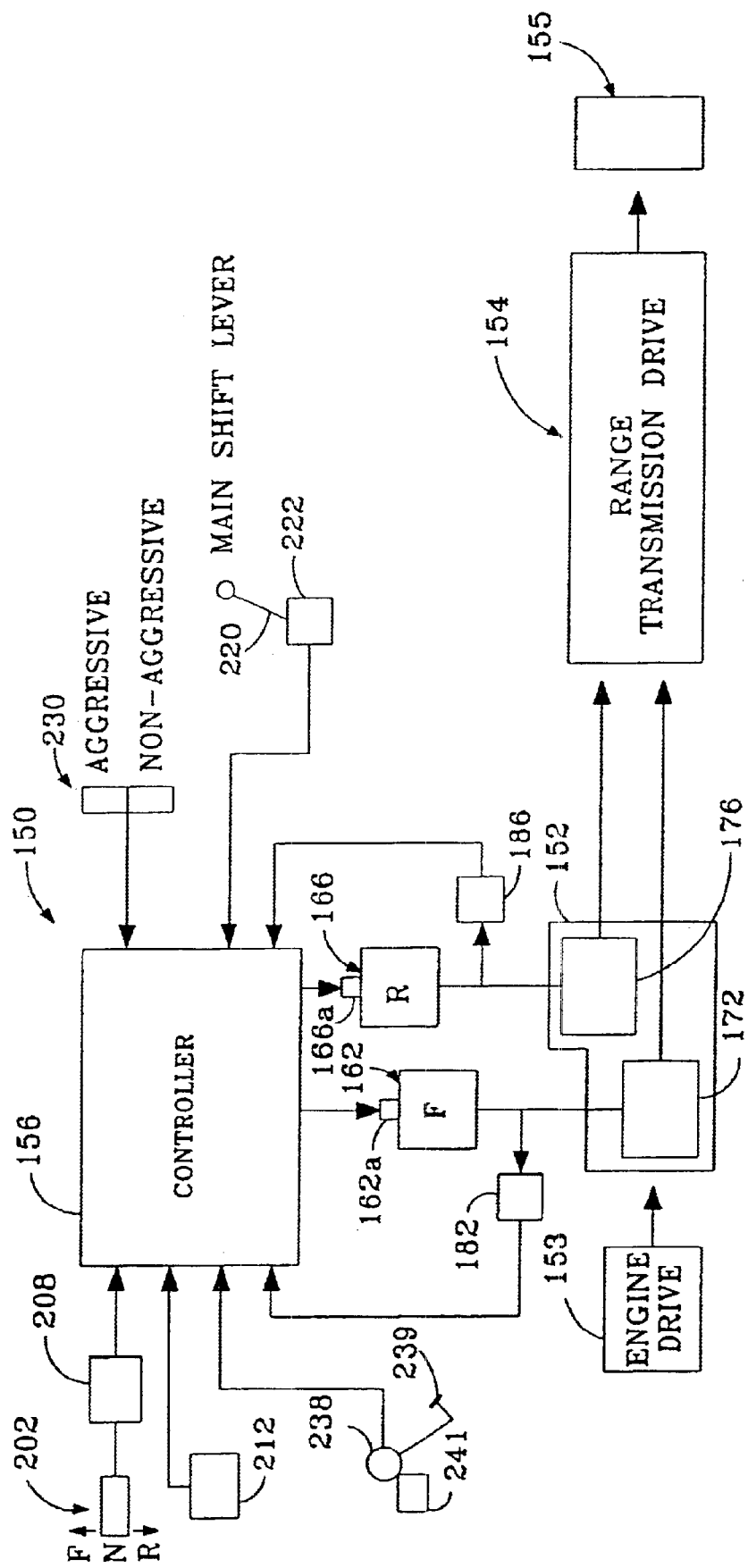
FIG. 1 is a block diagram of an alternate control system of the present invention applied to a reverser transmission utilizing forward and reverse clutch packs.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Transmission Control of a Reverser Transmission

FIG. 1 illustrates a control system 150 for use with a reverser transmission 152 of the type that uses electro-hydraulic control of clutch packs to engage forward or reverse tractor driving direction, for example as embodied in the POWRREVERSER™ transmission used in John Deere Series 4500 PRT and 4600 PRT tractors.

The reverser transmission 152 is driven by an engine drive 153. The reverser transmission 152 drives a range transmission 154 that drives one or more wheels via a differential (not shown). The reverser transmission can be used in a drive train such as disclosed in U.S. Pat. No. 6,002,976, herein incorporated by reference.

According to the invention, a controller 156, such as a microprocessor-based microcontroller, is signal-connected to forward and reverse proportional pressure control valves 162,166, which in turn are pressure-fluid-connected to forward and reverse clutch packs 172,176. The controller can be a microprocessor based electronic control module.

Pressure sensors or switches 182,186 are connected between the proportional valves 162,166 and the clutch packs 172,176. The pressure sensors 182, 186 act as feedback control sensors to the controller 156. A forward-neutral-reverse lever 202 is connected to switches 208, which are signal-connected to the controller 156. A seat switch 212 is also signal-connected to the controller 156. A main shift lever 220 includes a neutral position switch 222 that is also signal-connected to the controller.

A selectable aggressive/non-aggressive switch 230 is signal-connected to the controller. A clutch switch 234 and pedal position sensor, such as a potentiometer 238, are mounted to a clutch or "inching" pedal and signal-connected to the controller 156.

The forward and reverse clutch packs 172,178 are hydraulically-engaged and spring-released. The torque capacity of the clutch packs is thus a function of the hydraulic pressure supplied to the clutch packs. The proportional valves 162,166 produce a downstream hydraulic pressure that is proportional to the current applied to the respective valve's solenoid, and thus control the hydraulic pressure supplied to the respective forward or reverse clutch pack.

The controller 156 controls the current to the correct valve 162,166 and at the correct level to satisfy the clutch torque being commanded by the operator. Based on the operator's command via the vehicle direction selector 202, the forward, reverse, or neither control valve 162,166 is energized.

Based on the signal from a potentiometer 238, preferably a 5K ohm potentiometer, connected to a clutch pedal or "inching pedal" 239, the current to the respective control valve 162,166 is also modulated as a function of clutch pedal position. The current ramp commanded by the direction control selector 202, and the switch 230, is compared with the current commanded by the inching pedal potentiometer 238, and the lesser of the two currents is applied to the valve. When transitioning from fully depressed clutch pedal to any other pedal position, a fast fill time $T_{fill}$ is applied.

The inching pedal 239 includes a bottom of travel (BOT) switch 241. The BOT switch 241 is open only in the full pedal down position. Both switches 238, 241 switch system voltage as signals into the controller 156. A 5V reference and ground can be supplied to the potentiometer 238 and the potentiometer 238 returns a voltage to the controller 156 proportional to inching pedal position. Maximum voltage can be returned at the pedal up position with decreasing voltage as the pedal is depressed.

The control valves 162,166 include solenoids 162a, 166a. Both solenoids are driven via a capture compare function through the controller 156. The controller 156 modulates a component (FET/TRIAC) (not shown) that supplies the requested current to the proportional valve.

The control valve solenoids 162a, 166a are preferably pulse width modulated type drivers that are opened proportionally to the width of step pulses of current applied to the solenoids. The pulses are applied at a substantially constant frequency, and the pulse widths are controlled in order to modulate the opening of the valves 162,166.

When either control valve solenoid 162a,166a transitions from off to on there are three energizing phases. The first phase is a fast fill phase FP, the second phase is the ramp-on or modulation phase ROP, and the third phase is the static phase SP. These phases are shown graphically in FIG. 3.

As illustrated in FIG. 3, for a fill time $T_{fill}$, the respective control valve solenoid 162a,166a is supplied maximum current $I_{max}$, which represents the current at which the valve is full on or fully energized. $I_{max}$, can have a magnitude of 660 mA. The time $T_{fill}$ can be determined experimentally, preferably in a range of 0 to 250 ms. The purpose of the fill time is to quickly eliminate the clearance between the clutch friction plates and the clutch stationary plates in preparation for the ramp-on phase.

After $T_{fill}$, the control valve current from the controller is reduced to $I_{base}$, which represents the current required to produce the pressure to maintain the clutch piston displacement at a zero clutch friction plates-separator plates clearance, the net rotary force being approximately equal to zero. From $T_{fill}$ to $T_{ramp}$ the current rises from $I_{base}$ at the rate di/dt. Under steady-state conditions, the selected clutch pressure control valve can be driven at a current $I_{max}$ equal to 660 mA.

Forward and reverse shifts will commence after a new shift lever position has been indicated. Separate fill times and hold levels will be used for each direction. The shift preferably will involve the following in chronological order:

1. a period of fast fill at a maximum drive current 660 mA to bring the clutch to a position where it is just ready to transmit torque;
2. a hold period at a value that does not allow the clutch position to change, this value will be held just long enough to allow the transient movements of the valve to stabilize when coming off of the fast fill;
3. a series of multiple ramps, such as three ramps, for the remainder of the shift, from the hold level to the maximum drive current.

Use of Switches for Operational Control

The pressure transducers or pressure switches 182,186 are connected downstream of the forward and reverse valves 162,166, respectively. The transducers send an analog voltage to the controller 156. When pressure sensed by the switch is 182,186 passes a predefined threshold, a shift is considered underway.

1. If both pressure sensors are closed for more than one second, then a terminate signal is sent to a fuel cut off solenoid supplying fuel to the vehicle engine, and an error message is displayed.
2. If a neutral state is requested after one second and either of the pressure transducers are above their threshold values, then a terminate signal is sent to the fuel cut off solenoid and an error message is displayed.
3. If a "shuttle" (moving from forward directly to reverse, and vice versa) has been requested and after one second both pressure transducers have not changed state, then a terminate signal is sent to the fuel cut off solenoid and an error message is displayed.
4. If a shift is requested and the pressure transducer for the direction requested does not pass its threshold value in one second, and the inching pedal is greater than 25 percent of its travel, then the control defaults to neutral and an error message is displayed. The neutral position is that position wherein the valves 162,166 prevent pressurized fluid from actuating the clutch packs.

The transmission direction selector 202 comprises three switches 208 corresponding to forward, neutral and reverse. The switches cause system voltage to be switched into the controller 156.

The BOT switch 241 and the analog input of inching pedal position potentiometer 238 control the output level of the controller signal to the valves 162,166. When the BOT switch 241 is open at the bottom of clutch pedal travel, if after one second the pressure switches 182,186 are closed, then the fuel cut off solenoid is activated to discontinue engine fuel supply, and an error message is displayed. When the BOT switch 241 is open, the analog voltage from the inching pedal potentiometer 238 must be within a certain range. If outside this range then the signal from the controller 156 to the valves 162,166 defaults to neutral, and an error message is displayed.

If the inching pedal analog voltage from the potentiometer 238 is within a certain range consistent with being at the bottom of clutch pedal travel, and the BOT switch 241 closed switch signal is still present at the controller 156, then the signal from the controller 156 to the valves 162,166 defaults to neutral and an error message is displayed.

A shift can only take place if there is a forward or reverse signal from the direction control 202. If there are two or more signals (forward, reverse, neutral) at the controller 156 at the same time, or no signal for longer than one second, then the signal from the controller 156 to the valves 162,166 defaults to neutral, and an error message is displayed.

A shift can only take place if: after starting the tractor, the shift handle has been in neutral, the forward and reverse pressure switches 182,186 are open, the clutch BOT switch 241 signal changes state in either direction, and the inching pedal position analog signal is at a voltage that is appropriate for being at bottom of clutch pedal travel position. If the seat switch 212 is open from more than one second while the shift handled is in forward or reverse, the signal from the controller 156 to the valves 162,166 defaults to neutral, and an error message is displayed.

The invention also provides an interlock system. In order to start the engine on the vehicle, the following must be sensed at the controller:

1. The forward-neutral-reverse lever 202 must be sensed by the controller 156 to be in neutral. Neutral is defined as having a neutral signal in combination with no forward signal and no reverse signal.
2. The main transmission shift lever 220 must be in neutral as sensed by the controller 156 from the neutral position switch 222.
3. The tractor power-take-off must be turned off.

When the forward-neutral-reverse lever 202 is in the neutral position, no clutch-actuating hydraulic pressure must be sensed in either clutch pack 172, 176 or the tractor engine drive 153 will be shut off. When the forward-neutral-reverse lever 202 is in forward, then clutch-actuating hydraulic pressure must be present in the forward clutch pack 172, but not in the reverse clutch pack 176. Reverse drive also has similar logic. Because clutch pack hydraulic pressures will be in transition when the forward-neutral-reverse lever 202 is moved from one position to the other, time delays are provided to permit the ramping up or ramping down of pressure signals before the interlock logic is applied.

If hydraulic pressures in the forward or reverse clutch packs 172, 176 are not realized in approximately one second after the respective signal is received from the forward-neutral-reverse lever 202, then the controller 156 will disable motion in that direction until another neutral signal from the forward-neutral-reverse lever is sensed.

Reverser Transmission

Figure 2B:
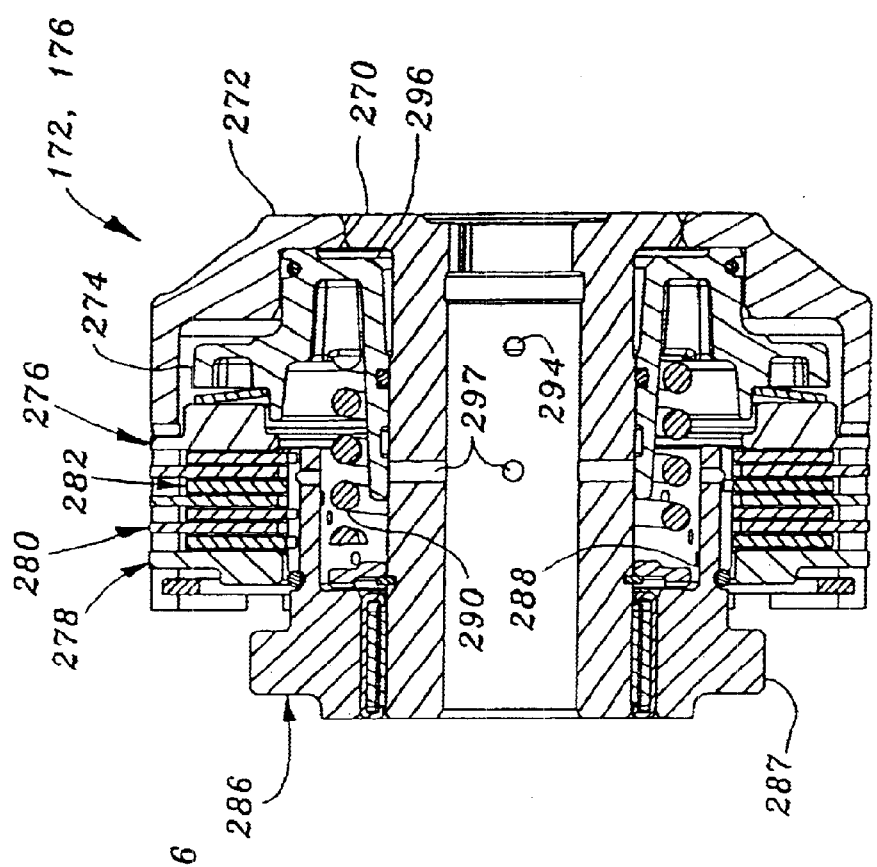
FIG. 2B is a schematic sectional view of a clutch pack.
Figure 2A:
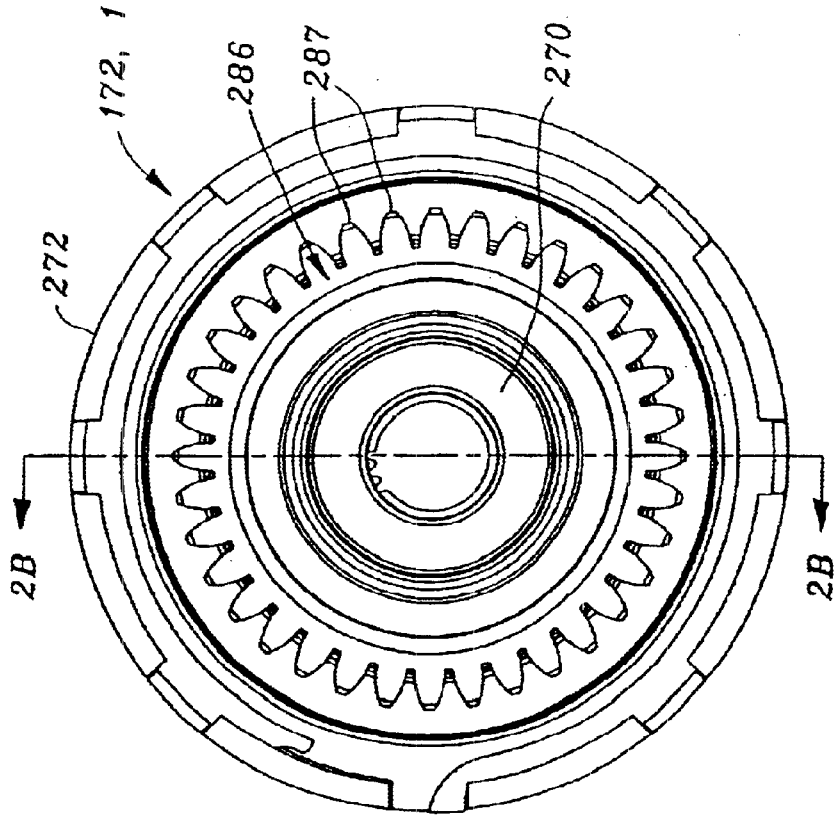
FIG. 2A is a front view of a clutch pack.

FIGS. 2A and 2B illustrate one of the identical clutch packs 172, 176. The clutch pack 172 includes a central cylinder 270 and a hub 272 connected thereto. A clutch piston 274 is located within the hub 272. A backup plate 276 and an end plate 278 are on opposite sides of a series of separator disks 280 and interposed friction disks 282. A clutch gear 286 includes a plurality of gear teeth 287 around its circumference and a central cylinder portion 288. The central cylinder portion 288 carries the friction disks 282 fixed to rotate therewith, and the hub 272 carries the backup plate 276, the end plate 278, and the separator disks 280. The separator disks 280 are fixed for rotation with the hub 272. A return spring 290 is compressed between the clutch piston 274 and the clutch gear 286 to maintain the friction disks 282 out of engagement with the separator disks 280 absent sufficient hydraulic pressure to engage the clutch pack 172. When sufficient pressurized hydraulic fluid is delivered to the clutch pack 172, the clutch gear 286 and the clutch piston 274 are drawn together to engage the friction disks 282 with the separator disks 280, between the backup plate 276 and the end plate 278. The disks 280, 282 engage for mutual rotation, causing the clutch gear 286 and the hub 272 and cylinder 270 to mutually rotate.

A radial aperture 294 is provided to feed pressurized fluid into or out of a space 296 between the clutch piston 274 and the cylinder 270. Pressurized hydraulic fluid forces the clutch piston 274 from right to left in the FIG. 6. Lubricating fluid flows through radial channels 297.

Figure 2C:
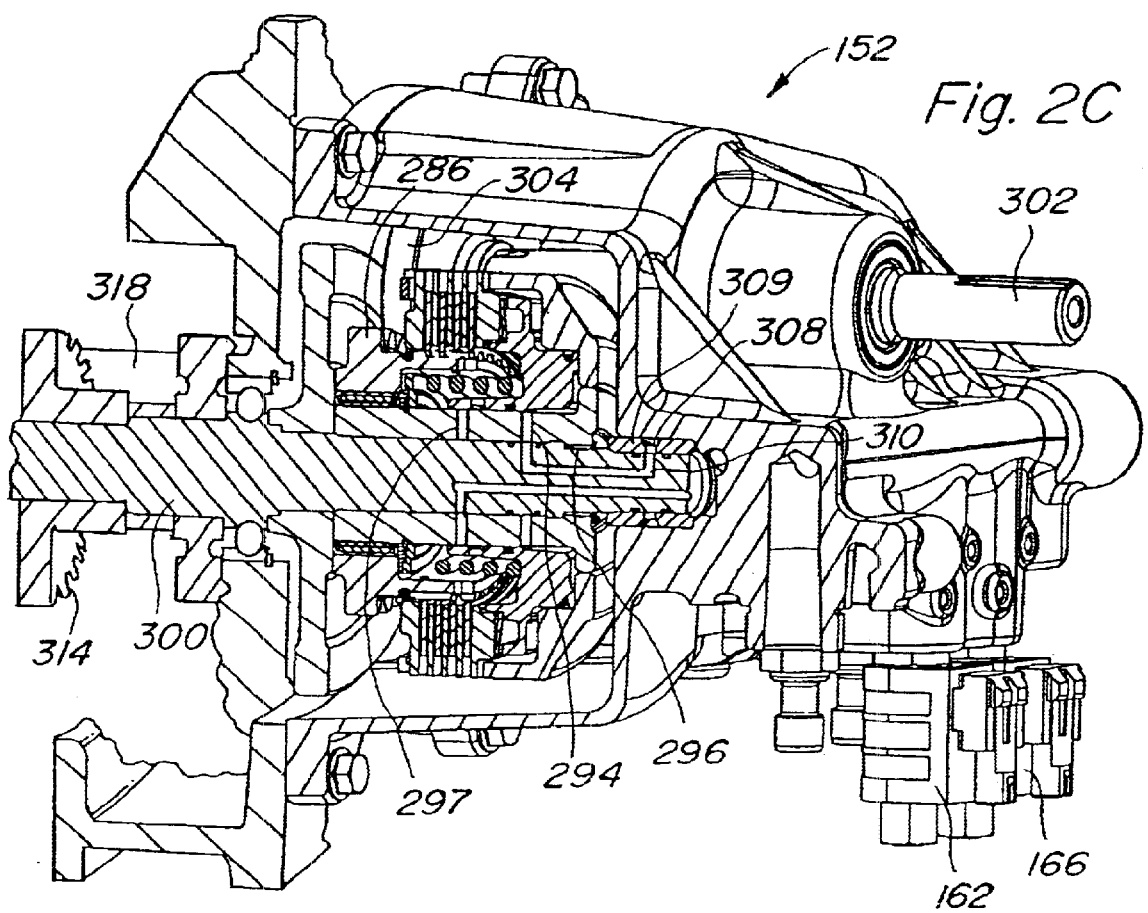
FIG. 2C is a schematic sectional view of a reverser transmission utilizing clutch packs for forward or reverse drive initiation, shown in a forward mode of operation.

FIG. 2C Illustrates the reverser transmission 152 in more detail. The clutch packs 172, 176 are arranged side by side, and only the forward clutch pack 172 is observable in FIG. 2C. A clutch output shaft 300 penetrates through the cylinder 270, and is splined, or otherwise fixed thereto. The control valves 162,166 route hydraulic fluid to the forward and reverse clutch packs 172, 176, and control operation of the reverser transmission 152.

For forward operation, power is transferred from the engine (not shown), through a clutch input shaft 302 and then to an input gear 304 and to the forward clutch pack 172. Particularly, the input gear 304 rotates the clutch gear 286. When the tractor is placed in forward and the clutch pedal is released, pressurized hydraulic fluid is routed through the valve 162, at a modulated pressure, through channels 308 formed in the transmission housing, through an aperture 309a in a seal ring assembly 309, and through channels 310 within the output shaft 300, through the cylinder 270, and through the aperture 294 bored through the cylinder 270, and to the space 296 of the clutch pack 172. The hydraulic fluid forces the clutch piston 274 to engage the clutch friction plates 282 together with the separator plates 280. When the friction and separator plates are engaged together, power is transferred from the clutch gear 286 to the clutch hub 272, to the clutch cylinder 270 and then to the output shaft 300. The output shaft 300 is connected to an output gear 314 and thereafter to the range transmission.

A further channel 316 through the shaft 300 provides fluid to the channels 297 for lubrication purposes.

The output shaft can have four gears (not shown) splined to it that are the input gears for the range transmission 154 such as a 4-speed transmission or gearbox (shown schematically in FIG. 5). Forward engagement of the clutch pack 172 causes the output shaft to rotate in the same direction as the engine flywheel.

Reverse operation occurs substantially in the same manner with the exception that the reverse control valve 166 modulates pressurized hydraulic fluid pressure that actuates the reverse clutch pack 176. The reverse clutch pack 176 drives a reverse output shaft 318 that is geared to the output gear 314 in a manner to reverse the relative rotation of the output shaft 300. During reverse operation, the forward clutch pack 172 is disengaged and the hub 270 can spin freely with the shaft 300.

Control Valves

Figure 2D:
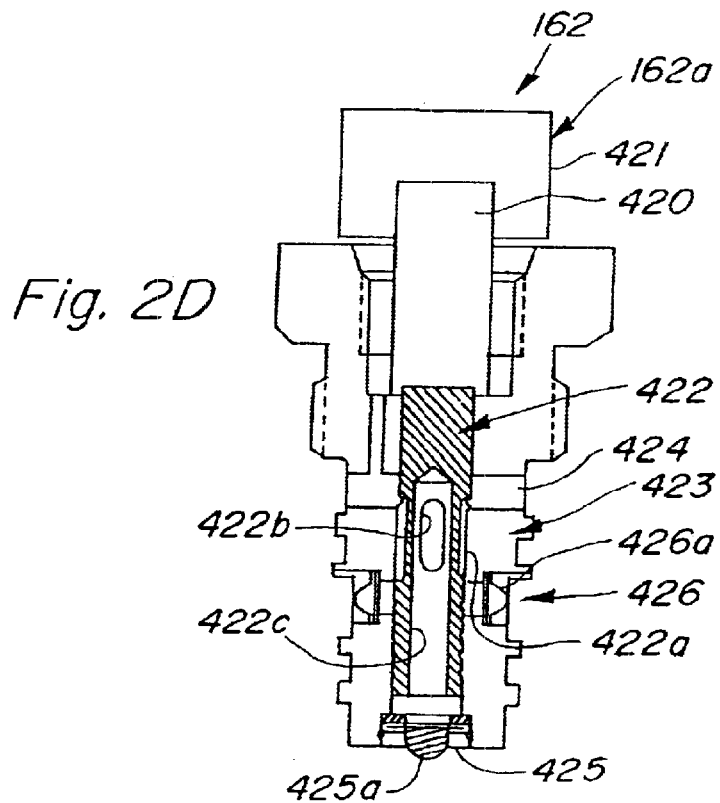
FIG. 2D is a schematic view of a control valve of the system of FIG. 1.

An exemplary example of a control valve, such as the control valve 162, is illustrated in FIG. 2D. The solenoid 162 includes a plunger 420 (shown schematically) driven by the solenoid coil 421 (shown schematically). The plunger 420 drives a valve spool 422 within a housing 423. The housing provides a pressurized hydraulic fluid inlet 426, in the form of plural openings, and an outlet 424, in the form of plural openings, to the hydraulic fluid reservoir. A control pressure outlet 425 communicates hydraulic fluid at a modulated pressure to the clutch pack 172 as shown in FIG. 1. The solenoid coil 421 drives the plunger 420 downward (in FIG. 3A) to open the inlet 426 to the outlet 425 through an annular channel 422a.

The channel 422a is open to an oblong orifice 422b through the spool 422 to communicate fluid into an interior 422c of the spool. The interior of the spool is open to the outlet 425. The pressure of the hydraulic fluid at the control outlet 425 is substantially proportional to the force applied to the spool by the plunger, ranging between reservoir pressure, the pressure at the outlet 425 with the inlet 426 closed, to pressurized hydraulic fluid supply pressure, the spool 422 moved down to close the outlet 424 and open the inlet 426.

An annular screen 426a and a circular screen 425a can be supplied to the inlet 426 and to the outlet 425 respectively.

The control valve 166 can be identically configured as described above for the control valve 162.

Hydraulic Pressure Ramp Profiles

FIG. 4 presents a comparison between a less aggressive power control and a more aggressive power control. As an example, for the more aggressive setting of the set switch 230, a 100 percent drive command corresponding to direction actuation by the selector 202, either forward or reverse, (clutch 100% engaged i.e., no clutch pedal 239 modulation)

results in a proportional hydraulic pressure, controlled by the software of the controller 156 and the respective control valve 162,166 in the respective clutch pack of the reverser transmission, within one second.

For the less aggressive setting, 100 percent of the drive command results in a corresponding hydraulic pressure, controlled by the software of the controller 156 and the respective control valve 162,166, in the respective clutch pack of the reverser transmission, within two seconds.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A vehicle control system comprising:
   a controller having a programmed acceleration circuit;
   a forward acceleration pedal having a position sensor that is signal-connected to an input of said programmed acceleration circuit in the controller;
   an electrically controlled hydraulic proportional control valve that is signal-connected to said programmed acceleration circuit of the controller;
   a transmission responsive to said hydraulic proportional control valve to drive a wheel;
   said programmed acceleration circuit includes a first programmed electric current control circuit having as a first output signal a first rate of change of electric current over time in response to said position sensor;
   said programmed acceleration circuit includes a second electric current control circuit having as a second output signal a second rate of change of electric current over time in response to said position sensor;
   a selection device for operator selection between said first and second electric current control circuits; and
   said control valve proportionally responsive to a selected one of said first and second output signals.

2. The control system according to claim 1, wherein said transmission comprises forward and reverse clutch packs, said proportional control valve controlling one of said clutch packs.

3. The control system according to claim 2, further comprising a clutch actuator having a clutch actuator position sensor that is signal-connected to said acceleration circuit of said controller, and operable to send a clutch actuator position signal that is proportional to clutch actuator position, said acceleration circuit modulating said first or second output signal in proportion to said clutch actuator position signal.

4. The control system according to claim 3, wherein said clutch actuator comprises a clutch pedal operated by an operator's foot, and said clutch actuator position sensor comprises a potentiometer connected to said pedal.

5. The control system according to claim 2, wherein each clutch pack includes clutch friction plates and clutch stationary plates, and each output signal includes three phases, a fast fill phase wherein a maximum current is applied for an initial duration of time to take up clearance between clutch friction plates and clutch stationary plates, a ramp-on phase wherein the current is increased substantially linearly over time, and a static phase wherein the maximum current is maintained to completely engage the clutch friction plates and stationary plates.

6. A vehicle control system comprising:
   a controller having a programmed acceleration circuit;
   a forward acceleration pedal having a position sensor that is signal-connected to an input of said programmed acceleration circuit in the controller;
   a reverse acceleration pedal having a position sensor that is signal-connected to an input of said programmed acceleration circuit in the controller;
   a forward electrically controlled hydraulic proportional control valve that is signal-connected to said programmed acceleration circuit of the controller;
   a reverse electrically controlled hydraulic proportional control valve that is signal-connected to said programmed acceleration circuit of the controller;
   a transmission responsive to said hydraulic proportional control valves to drive a wheel in forward or reverse respectively;
   a first pressure sensor connected downstream of said forward control valve, and a second pressure sensor connected downstream of said reverse control valve, said first and second pressure sensors being signal-connected to said controller; and
   said controller including a feedback circuit that controls said transmission based on signals from said first and second pressure sensors.

7. The vehicle control system according to claim 6, wherein said feedback circuit includes an engine shut off circuit activated to shut down the vehicle engine, and if either of said first and second pressure sensors sends an elevated pressure signal to said controller for a predetermined length of time, when said elevated pressure is not commanded by an operator, then said engine shut off circuit is activated.

8. The vehicle control system according to claim 6, wherein said feedback circuit includes a neutral engaging circuit which removes both said first and second output signals to said control valves, and if either of said first and second pressure sensors fails to send an elevated pressure signal to said controller for a predetermined length of time, when said elevated pressure is commanded by an operator, then said controller engine neutral engaging circuit is activated.

9. A vehicle control system comprising:
   a control;
   a directional device activated by a user to send an acceleration demand signal to said control;
   said control having an acceleration circuit receiving said acceleration demand signal and producing a selectable output signal proportional to said demand signal selectable between a first output signal and a second, greater output signal;
   an operator controlled selector for selecting between said first and second output signals;
   a transmission arranged for directing power to a wheel, said transmission responsive to said selectable output signal to accelerate said wheel.

10. The control system according to claim 9, wherein said control comprises a microcontroller.

11. The control system according to claim 9, wherein said transmission comprises clutch packs to control transmission power direction, said clutch packs responsive to said output signal.

12. The control system according to claim 9, wherein said acceleration demand signal comprises an electric signal proportional to device position.

13. The control system according to claim 9, wherein said device includes a potentiometer for providing said input signal, said input signal proportional to device position.

14. A method of controlling the acceleration aggressiveness of a transmission, comprising the steps of:

obtaining an acceleration input signal from an operator controllable device;

selecting one out of at least a first and a second acceleration function, each producing an output signal, said first acceleration function producing a first output signal and said second acceleration function producing a second, greater output signal;

said output signal being signal-connected to a transmission hydraulic control valve to control acceleration of said transmission.

15. The method according to claim 14, wherein said step of selecting one acceleration function is further defined in that said one acceleration function is selected from an infinite number of acceleration functions selectable by a potentiometer.

16. The method according to claim 14, wherein said step of selecting one acceleration function is further defined in that said acceleration function is further defined in that said acceleration function is selectable between said first and second acceleration functions alternatively by a switch.

17. The control system according to claim 1, wherein said transmission comprises a clutch pack that is engaged to transfer power from said transmission to said wheel, said clutch pack proportionally engaged by hydraulic fluid pressure that is controlled by said control valve, and said first rate of change of electric current causes hydraulic fluid pressure to said clutch pack to change at a first hydraulic pressure change rate when an acceleration signal is applied to said input of said programmed acceleration circuit; and wherein said second rate of change of electric current causes hydraulic fluid pressure to said clutch pack to change at a second hydraulic pressure change rate when an acceleration signal is applied to said input of said programmed acceleration circuit;

said first hydraulic pressure change rate being greater than said second hydraulic pressure change rate.

18. The control system according to claim 17, wherein said first and second hydraulic pressure change rates are substantially linear.

19. The control system according to claim 18, wherein said first hydraulic pressure change rate is substantially twice the second hydraulic pressure change rate.

20. The control system according to claim 1, wherein said first rate of change of electric current and said second rate of change of electric current are substantially linear sloped regions on a current versus time graph, and the linear region of said first rate of change of electric current is greater than the linear region of said second rate of change of electric current.

* * * * *